May 27, 1947.  A. DELANO  2,421,186
CHAIN LINK
Filed June 15, 1944
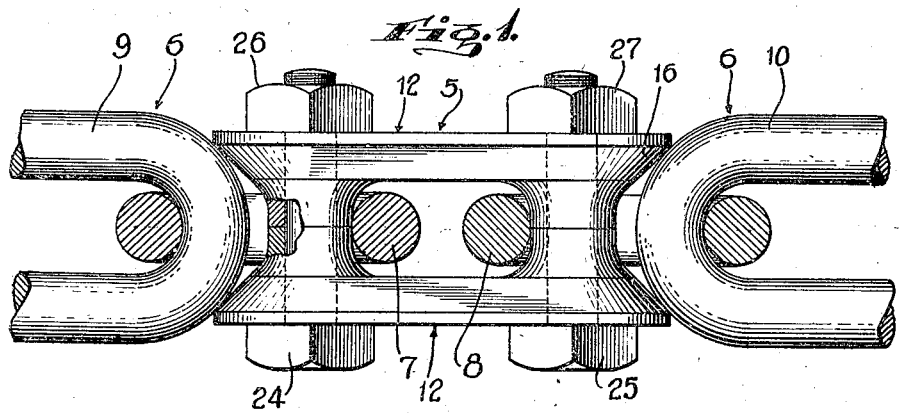
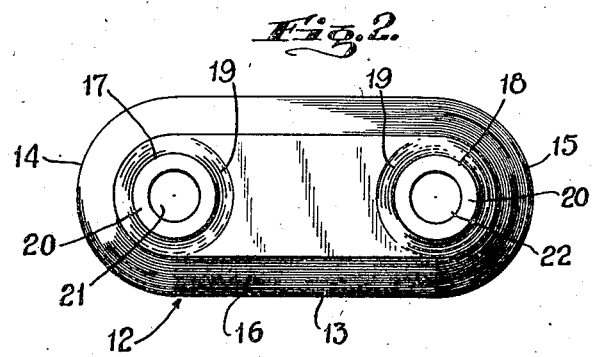
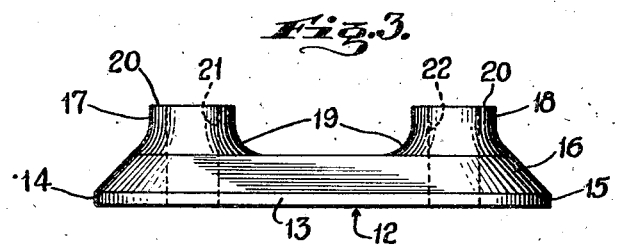
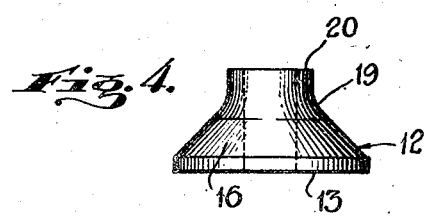
INVENTOR
HOWARD A. DELANO
BY
ATTORNEY Patented May 27, 1947

2,421,186

UNITED STATES PATENT OFFICE 2,421,186

CHAIN LINK

Howard A. Delano, York, Pa., assignor to American Chain & Cable Company, Inc., Bridgeport, Conn., a corporation of New York Application June 15, 1944, Serial No. 540,487

5 Claims. (Cl. 59—87)

1

This invention relates to a chain link and more particularly to a repair link.

Among the objects of my invention is the construction of a two-part chain link, the parts of which may be readily assembled and connected with links of two chain sections for repair purposes, for connecting two chains and for takeup or adjustment purposes either of a continuous chain or of a chain construction comprising a plurality of chains or chain sections, etc.

It is also an object of this invention to provide a construction which may be drop forged, which is sturdy, which provides for the proper flexibility at the point of repair or connection and which is so constructed as to prevent shearing and tensile stresses on the connecting bolts.

Other objects of this invention will be apparent from the following description taken in connection with the accompanying drawings in which—

Fig. 1 is a plan view of a chain showing my improved link used as a repair link;

Fig. 2 is a top plan view of a half link element or side member of my improved link;

Fig. 3 is a side view of the half link element; and

Fig. 4 is an end view of the half link element.

The preferred form of chain link is shown at 5 in Fig. 1 as a repair link substituted for a broken or worn link in a chain 6 consisting of elongated links of round wire stock and connecting the end links 7 and 8 at the break, Fig. 1 also showing links 9 and 10 adjacent to the end links and the structural relation of the repair link 5 to the links 7, 8, 9 and 10.

The link preferably and as disclosed consists of two identical parts or halves 12 each comprising a base plate 13 which constitutes a side member of the link. The base plate is of elongated form of shorter transverse dimensions, but of a greater length than the links of the chain and is provided with round ends 14 and 15 to permit substantially unrestricted movement of the links 9 and 10 in planes normal to the planes of the links.

The upper corner of the base plate 13 is cut away or beveled as at 16 to permit substantially unrestricted movement of the links 9 and 10 in their planes as appears clear from Fig. 1.

Projecting from the upper face of the base plate 13 are lugs or bosses 17 and 18 of the same construction, each having an enlarged tapered lower or base end 19 and a cylindrical upper or free end 20. The lugs or bosses and the base plate are provided with bolt receiving holes 21 and 22 extending axially of the bosses to receive connecting bolts 24 and 25 (Fig. 1) with which cooperate nuts 26 and 27 for securing the half link elements together. The upper cylindrical ends 20 of the bosses which are aligned at the center of the assembled link provide a cylindrical seat or bearing for the end links 7 and 8 so that the end links will not tend to spread the repair link and break the connecting bolts 24 and 25 as the chain is put under tension and also to prevent shearing stresses on the connecting bolts.

While a preferred embodiment of my invention is illustrated and described for the purpose of disclosing my invention, it is to be understood that I desire to cover all such modifications thereof as fall within the principles of my invention and the scope of the appended claims.

What I claim is:

1. A half-link comprising a plate provided with semi-circular ends and with a continuous beveled corner on one side of said plate, and bosses projecting from said side of said plate at the center of said semi-circular ends and having at their outer ends bearing surfaces for abutment with mating surfaces on the bosses of a similar link, said bosses and plate being provided with through-holes extending axially of said bosses.

2. A half-link comprising a plate provided with semi-circular ends and with a continuous beveled corner on one side of said plate, and bosses projecting from said side of said plate at the center of said semi-circular ends, said bosses tapering from their bases toward their free ends and terminating in cylindrical end portions and said bosses and plate being provided with through-holes extending axially of said bosses.

3. A half-link comprising a plate provided with semicircular ends having beveled corners on one side of said plate and bosses projecting from said side of said plate at the center of said semi-circular ends and having at their outer ends bearing surfaces for abutment with mating surfaces on the bosses of a similar link, said bosses and plate being provided with through-holes extending axially of said bosses.

4. A link comprising two complementary side elements each consisting of a plate, a boss adjacent each end of said plate projecting from one side of said plate, the bosses of one side element abutting the bosses of the other side element said bosses and plate being provided with holes extending axially of said bosses and securing means extending through said holes and holding said elements against separation.

5. A link comprising two identical complementary side elements each consisting of a plate, a boss adjacent each end of said plate projecting from one side of said plate, said bosses and plate being provided with holes extending axially of said bosses and securing means extending through said holes and holding said elements against separation, the base end of each boss being of increasing diameter toward the plate and the free end of each boss being cylindrical for a distance greater than half of the thickness of a chain link to which said link is to be connected.

HOWARD A. DELANO.

REFERENCES CITED

The following references are of record in the file of this patent:

UNITED STATES PATENTS

| Number | Name | Date |
|---|---|---|
| 1,925,055 | Mize | Aug. 29, 1933 |

FOREIGN PATENTS

| Number | Country | Date |
|---|---|---|
| 197,289 | Great Britain | Nov. 22, 1923 |